No. 855,634. PATENTED JUNE 4, 1907.
W. B. HINDMAN.
COMBINED COTTON CHOPPER AND CULTIVATOR.
APPLICATION FILED SEPT. 20, 1906.
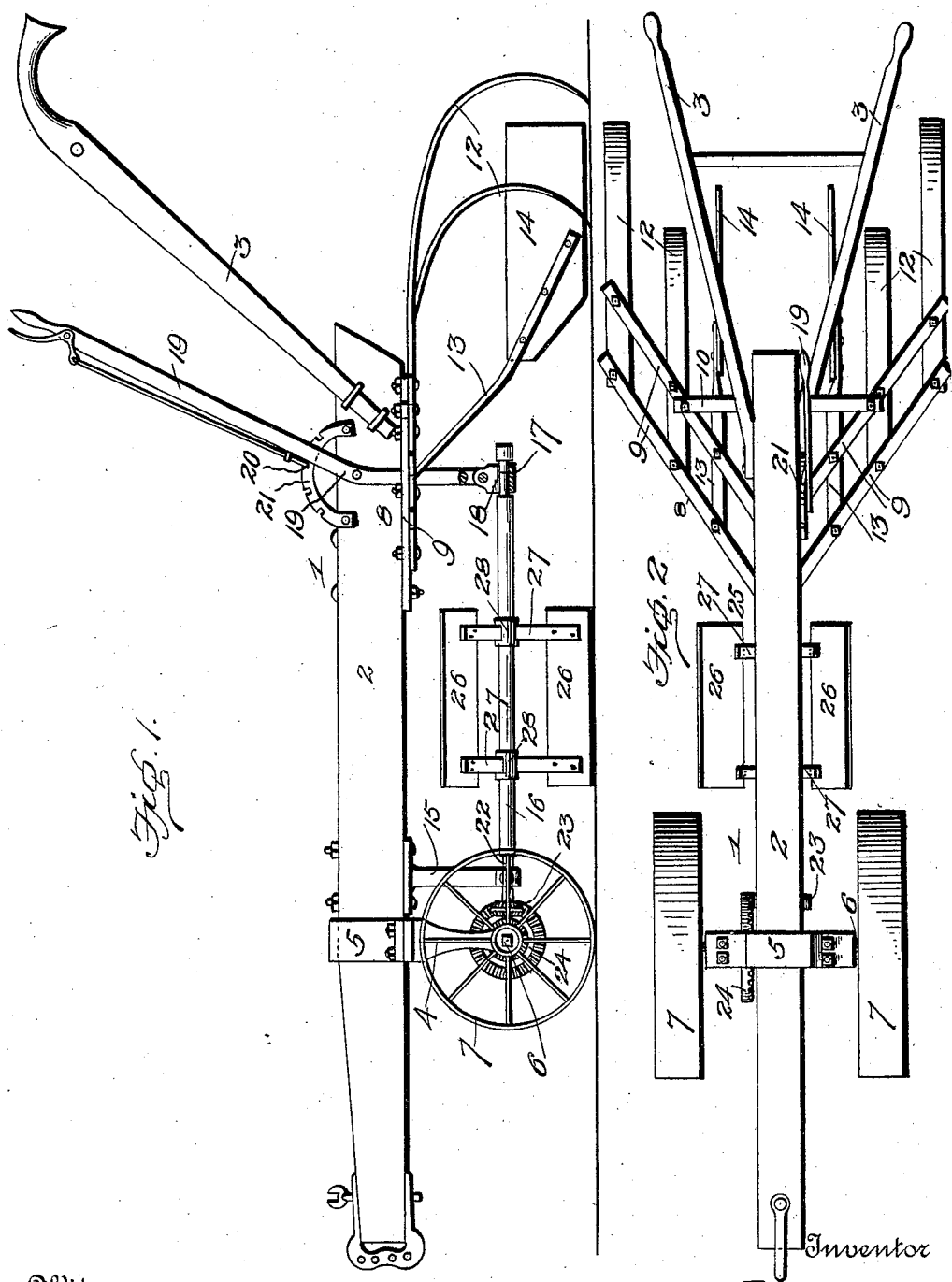
Witnesses
C. E. Hunt
C. H. Griesbauer
Inventor
W. B. Hindman
by H. B. Willson & Co.
Attorneys

UNITED STATES PATENT OFFICE.

WILLIAM B. HINDMAN, OF NEWMAN, GEORGIA.

COMBINED COTTON CHOPPER AND CULTIVATOR.

No. 855,634.     Specification of Letters Patent.     Patented June 4, 1907.

Application filed September 20, 1906. Serial No. 335,386.

*To all whom it may concern:*

Be it known that I, WILLIAM B. HINDMAN, a citizen of the United States, residing at Newman, in the county of Coweta and State of Georgia, have invented certain new and useful Improvements in a Combined Cotton Chopper and Cultivator; and I do declare the following to be a full, clear, and exact description of the invention, such as will enable others skilled in the art to which it appertains to make and use the same.

This invention relates to improvements in combined cotton choppers and cultivators.

The object of the invention is to provide a machine of this character by means of which rows of cotton may be simultaneously thinned and cultivated, means being provided whereby the chopping hoes may be operated at various speeds, thereby enabling more or less cotton to be left standing as may be desired.

With the above and other objects in view, the invention consists of certain novel features of construction, combination and arrangement of parts, as will be hereinafter described and claimed.

In the accompanying drawings:—Figure 1 is a side view of a combined cotton chopper and cultivator constructed in accordance with the invention; and Fig. 2 is a top plan view of the same.

Referring more particularly to the drawings, 1 denotes the cultivator comprising a beam 2, at the rear end of which are connected suitable handles 3, and on which near the forward end is secured a bearing bracket 4, said bracket being preferably secured upon the beam by means of a clip 5. Journaled in the bracket 4 is an axle 6, upon the ends of which is mounted a pair of supporting wheels 7.

Secured to the under side of the rear end of the beam 2 are pairs of blade supporting obliquely - disposed rearwardly - projecting parallel bars 9, the inner pair of which is connected by a cross bar 10. Secured to the bars 10 are rearwardly-projecting downwardly-curved cultivator blades or shovels 12, said blades being preferably arranged in pairs on each side of the center of the machine. One of the blades on each side is arranged at a plane in rear of the other blades. Also connected to the bars 9 are rearwardly-projecting arms 13, to the rear ends of which are secured fender plates 14 which move along each side of the rows of cotton to prevent the same from being covered by the cultivator blades.

On the under side of the beam 2 in rear of the bracket 4 is a depending bearing bracket 15, in which is pivoted and slidably mounted the forward end of a chopping hoe shaft 16, the rear end of which is reduced, as shown at 17. With the reduced portion 17 of the shaft is engaged a collar 18, in which the rear end of the shaft is journaled. The collar 18 is pivotally connected to the lower end of an angularly bent adjusting lever 19, which is pivotally connected to one side of the beam 2 and is provided with a pawl 20 adapted to engage a segmental rack 21 also secured to the beam 2.

The forward end of the shaft 16 where the same is slidably journaled in the bracket 15, is reduced as shown at 22, and on the end of said reduced portion is fixedly mounted a gear pinion 23. The pinion 23 is adapted to be engaged with a differential gear 24 mounted on the axle 6 of the supporting wheel 7, whereby the movement of said wheel may be imparted to the chopping hoes shaft, as will be understood. The differential gear 24 is here shown as provided with a plurality of concentrically arranged annular series of teeth, with one or the other of which series the pinion 23 is adapted to be engaged by shifting the shaft 16 forwardly or rearwardly by means of the adjusting lever 19, thereby varying the speed of the shaft and the parts carried thereby.

On the shaft 16 are mounted chopping hoes 25, said hoes comprising longitudinally-disposed blades 26, which are connected at their outer ends to radially-disposed shanks or arms 27, the inner ends of which are secured to hubs or collars 28 fixedly mounted upon the shaft 16. Any desired number of hoe blades 26 may be employed, there being preferably three, only two of which are shown in each of the figures of the drawings in the present instance.

In operation as the machine is drawn forwardly, the cultivator blades 12 on the rear of the beam will work the soil on each side of the rows of cotton while the chopping blades will thin out the rows leaving only the desired amount of cotton standing. The amount of cotton left standing may be varied or determined by the speed in which the hoes travel, the latter being regulated by the engagement of the pinion 23 with one or the other series of teeth on the differential gear 24. By shifting the shaft 16 rearwardly a sufficient distance, the pinion 23 thereon may be entirely disengaged from the differential gear 24, thereby throwing the hoes out of gear and enabling the machine to be used as a cultivator alone.

Owing to the pivotal support of the beam near its forward end by the axle 6, whereby the most desirable results are secured, it becomes necessary to support the rear end of the beam which is best done by the cultivator blades 12. This takes the load off the operator who will otherwise be compelled to constantly hold up the chopping mechanism besides trying to regulate its depth. And by extending the bars 9 laterally from each side of the beam, the supports or blades 12 are located at such a distance on each side of the beam as to miss the row and also to prevent the beam from twisting or turning in the clip 5 and permits of the supporting wheels 7 being placed close together for convenience in handling without danger of the machine upsetting, and especially upon inclined or sloping ground.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

A cotton chopper comprising a beam, a vertically depending bracket attached thereto, a shaft journaled in said bracket and equipped with transporting wheels, a differential gear fixed upon the shaft and provided with two concentric rows of teeth, a second bracket attached to and depending from the beam at a point in rear of the first-mentioned bracket and having in its lower end a bearing, a chopper shaft having its forward end journaled in said bearing and also arranged for sliding movement therethrough, a pinion fixed on the forward end of the chopper shaft for engagement with the differential gear, chopping blades fixed to and for rotation with the chopper shaft, the latter being provided near its rear end with a reduced shouldered portion, an operating lever pivoted to the beam and carrying at its lower end a pivoted bearing collar in which the reduced shouldered portion of the shaft is journaled, said lever being operable for moving the chopper shaft to bring the pinion into mesh with either row of teeth or to throw the pinion wholly out of engagement with the gear, and means for fixing the lever against movement.

In testimony whereof I have hereunto set my hand in presence of two subscribing witnesses.

WILLIAM B. HINDMAN.

Witnesses:
R. H. LOVEJOY,
J. D. SUMMERS.